United States Patent
Ryu et al.

(10) Patent No.: US 8,935,627 B2
(45) Date of Patent: Jan. 13, 2015

(54) MOBILE TERMINAL AND METHOD OF CONTROLLING OPERATION OF THE MOBILE TERMINAL

(75) Inventors: Hyejin Ryu, Seoul (KR); Miyoung Kim, Seoul (KR); Seungheon Han, Seoul (KR); Yeerang Yun, Seoul (KR); Youngjun Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 355 days.

(21) Appl. No.: 13/088,183

(22) Filed: Apr. 15, 2011

(65) Prior Publication Data

US 2011/0296334 A1    Dec. 1, 2011

(30) Foreign Application Priority Data

May 28, 2010  (KR) .......................... 10-2010-0050536

(51) Int. Cl.
  *G06F 3/048* (2013.01)
  *G06F 3/0488* (2013.01)
  *G06F 3/0483* (2013.01)
  *G06F 15/02* (2006.01)

(52) U.S. Cl.
  CPC .......... *G06F 3/04883* (2013.01); *G06F 3/0483* (2013.01); *G06F 15/0291* (2013.01); *Y10S 345/901* (2013.01)
  USPC ........... 715/776; 715/701; 715/702; 715/853; 715/854; 345/173; 345/901

(58) Field of Classification Search
  CPC .............. G06F 15/0291; G06F 3/01–3/04886; G06F 17/21–17/247
  USPC ........... 715/776–777, 863; 345/156, 173, 901
  See application file for complete search history.

(56) References Cited

U.S. PATENT DOCUMENTS

| | | | | |
|---|---|---|---|---|
| 5,463,725 A | * | 10/1995 | Henckel et al. | 715/776 |
| 8,347,232 B1 | * | 1/2013 | Prud'Hommeaux et al. | 715/833 |
| 2001/0007980 A1 | * | 7/2001 | Ishibashi et al. | 705/26 |
| 2001/0024195 A1 | * | 9/2001 | Hayakawa | 345/173 |
| 2002/0083101 A1 | * | 6/2002 | Card et al. | 707/526 |
| 2004/0183776 A1 | * | 9/2004 | Ho | 345/156 |
| 2005/0005246 A1 | * | 1/2005 | Card et al. | 715/776 |

(Continued)

FOREIGN PATENT DOCUMENTS

CN  1877505  12/2006
WO  WO 2011094855 A1 * 8/2011

OTHER PUBLICATIONS

State Intellectual Property Office of the People's Republic of China Application Serial No. 201110101288.8, Office Action dated Feb. 4, 2013, 5 pages.

*Primary Examiner* — William Bashore
*Assistant Examiner* — Linda Huynh
(74) *Attorney, Agent, or Firm* — Lee, Hong, Degerman, Kang & Waimey

(57) ABSTRACT

A mobile terminal includes a display module displaying an electronic document screen showing at least one full page among a plurality of pages of an electronic document, and the display module receives a first input for setting a number of pages to be turned among the plurality of pages. The mobile terminal further includes a controller which sets the number of pages in response to the first input, turns the set number of pages in response to a second input received proximate to the electronic document screen, and displays a subsequent page following the set number of pages turned on the electronic document screen.

23 Claims, 12 Drawing Sheets

(56) References Cited

U.S. PATENT DOCUMENTS

| | | | |
|---|---|---|---|
| 2006/0294473 A1* | 12/2006 | Keely et al. | 715/776 |
| 2008/0022223 A1* | 1/2008 | Seet et al. | 715/776 |
| 2008/0040692 A1* | 2/2008 | Sunday et al. | 715/863 |
| 2008/0222552 A1* | 9/2008 | Batarseh et al. | 715/776 |
| 2009/0271703 A1* | 10/2009 | Chu et al. | 715/702 |
| 2009/0293009 A1* | 11/2009 | Meserth et al. | 715/771 |
| 2010/0175018 A1* | 7/2010 | Petschnigg et al. | 715/776 |
| 2011/0039602 A1* | 2/2011 | McNamara et al. | 455/566 |
| 2011/0050591 A1* | 3/2011 | Kim et al. | 345/173 |
| 2012/0098752 A1* | 4/2012 | Glenn | 345/173 |
| 2012/0311438 A1* | 12/2012 | Cranfill et al. | 715/256 |

* cited by examiner (a)                  (b)

MOBILE TERMINAL AND METHOD OF CONTROLLING OPERATION OF THE MOBILE TERMINAL

CROSS-REFERENCE TO RELATED APPLICATION

Pursuant to 35 U.S.C. §119(a), this application claims the benefit of earlier filing date and right of priority to Korean Patent Application No. 10-2010-0050536, filed on May 28, 2010, the contents of which are hereby incorporated by reference herein in their entirety.

FIELD OF THE INVENTION

The present invention relates to a mobile terminal and a method of controlling the operation of the mobile terminal. In particular, the present invention relates to a mobile terminal which can control various operations related to electronic documents and a method of controlling the operation related to electronic documents in the mobile terminal.

DESCRIPTION OF THE RELATED ART

Mobile terminals are portable devices capable of performing, among others, voice/video calls, inputting and outputting information, and/or storing data. As the functions of mobile terminals diversify, an increasing number of mobile terminals have been equipped with various functions, such as capturing photos and moving images, playing music files and moving image files, providing games, receiving broadcast programs, reading electronic documents, and providing wireless Internet services, and have thus evolved into multifunctional multimedia players.

Further, when an electronic document such as an electronic book (e-book) is displayed on a mobile terminal, users can navigate from one page to another page by using buttons or touching a display screen on the mobile terminal, can navigate through the electronic document in units of a predefined number of pages, or can directly jump to any desired page. However, no intuitive user interfaces (UIs) or methods have yet been developed that can provide users with the experience of flipping or navigating through paper pages of a physical book.

Therefore, it is useful to develop ways to control the operations of mobile terminals using a new input method other than a conventional key or touch input method in order to facilitate display of electronic documents and use of various functions associated with the display of the electronic documents.

SUMMARY OF THE INVENTION

Presented herein is a mobile terminal which can control various operations related to electronic documents using a new input method involving various combinations of a touch input, a drag input and a flicking input, and a method of controlling the operation of the mobile terminal.

According to an embodiment of the present invention, a method of controlling display of an electronic document in a mobile terminal includes displaying an electronic document screen showing at least one page among a plurality of pages of the electronic document on a display of the mobile terminal, receiving a first input for setting a number of pages to be turned among the plurality of pages via the electronic document screen, setting the number of pages based on duration of the first input, the number of pages increasing as the duration increases, receiving a second input for flipping through the set number of pages via the electronic document screen, flipping through the set number of pages in response to the second input, and displaying a subsequent page following the set number of pages flipped through on the electronic document screen.

According to another embodiment of the present invention, a method of controlling display of an electronic document in a mobile terminal includes displaying an electronic document screen showing at least one page among a plurality of pages of the electronic document on a display of the mobile terminal, receiving a first input comprising a first drag input in a first direction proximate to the electronic document screen, the first drag input starting from a first point and ending at a second point proximate to the electronic document screen, displaying the electronic document screen showing N number of pages in response to the first input, wherein N is determined based on a distance between the first point and the second point, and the N number of pages are visually pulled or lifted up in real time while the first input is received such that the N number of pages are displayed in a virtual stack, each of the N number of pages being displayed individually in the virtual stack, receiving a second input comprising a second drag input or a first flicking input in the first direction proximate to the electronic document screen, the second drag input or the first flicking input starting from the second point, flipping through the N number of pages in response to the second input, and displaying a subsequent page following the N number of pages flipped through on the electronic document screen. In one aspect of the present invention, the pulled N number of pages sequentially return to their original position in the absence of the second input.

According to yet another embodiment of the present invention, a mobile terminal includes a display module displaying an electronic document screen showing at least one full page among a plurality of pages of an electronic document, the display module receiving a first input for setting a number of pages to be turned among the plurality of pages, and a controller that sets the number of pages in response to the first input, turns the set number of pages in response to a second input received proximate to the electronic document screen, and displays a subsequent page following the set number of pages turned on the electronic document screen.

BRIEF DESCRIPTION OF THE DRAWINGS

The above and other features and advantages of the present invention will become more apparent by describing in detail preferred embodiments thereof with reference to the attached drawings.

DETAILED DESCRIPTION

The present invention will hereinafter be described in detail with reference to the accompanying drawings in which exemplary embodiments of the invention are shown.

The term 'electronic device,' as used herein, may indicate a tablet computer, a mobile phone, a smart phone, a laptop computer, a digital broadcast receiver, a personal digital assistant (PDA), a portable multimedia player (PMP), a navigation device, a desktop computer, an electronic-book (e-book) reader, and the like. In this disclosure, the terms 'module' and 'unit' can be used interchangeably.

Figure 1:
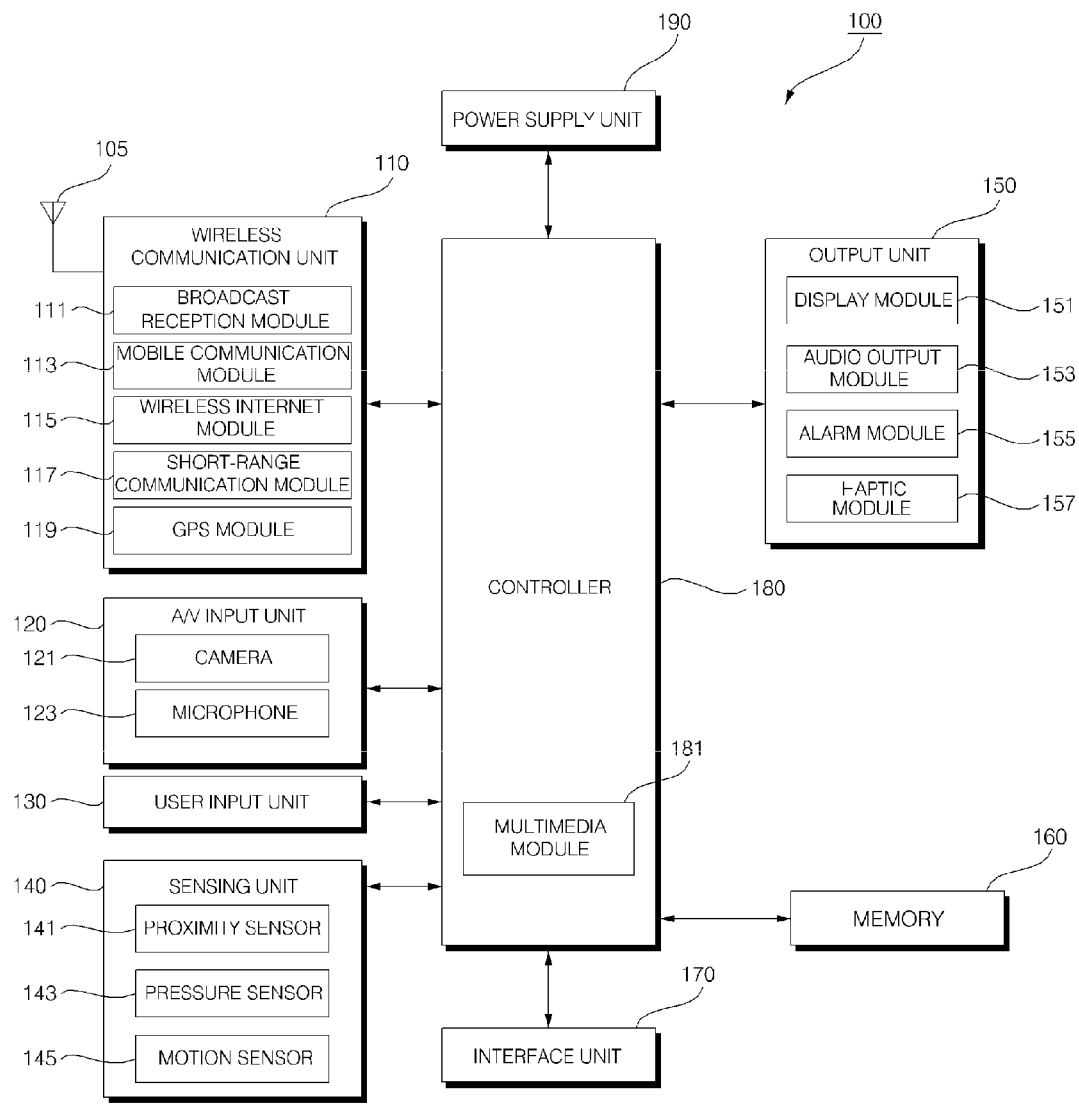
FIG. 1 illustrates a block diagram of a mobile terminal according to an embodiment of the present invention.

FIG. 1 illustrates a block diagram of an electronic device, for example, a mobile terminal 100, according to an embodiment of the present invention. Referring to FIG. 1, the mobile terminal 100 may include a wireless communication unit 110, an audio/video (A/V) input unit 120, a user input unit 130, a sensing unit 140, an output unit 150, a memory 160, an interface unit 170, a controller 180, and a power supply unit 190. Here, when the above constituent elements are implemented, two or more of the constituent elements may be combined into one constituent element, or one constituent element may be divided into two or more constituent elements, if appropriate.

The wireless communication unit 110 may include a broadcast reception module 111, a mobile communication module 113, a wireless Internet module 115, a short-range communication module 117, and a global positioning system (GPS) module 119.

The broadcast reception module 111 may receive broadcast signals and/or broadcast-related information from an external broadcast management server through a broadcast channel. The broadcast channel may be a satellite channel or a terrestrial channel. The broadcast management server may be a server which generates broadcast signals and/or broadcast-related information and transmits the generated broadcast signals and/or the generated broadcast-related information or may be a server which receives and then transmits previously-generated broadcast signals and/or previously-generated broadcast-related information.

The broadcast-related information may include broadcast channel information, broadcast program information and/or broadcast service provider information. The broadcast signals may include a TV broadcast signal, a radio broadcast signal, a data broadcast signal, the combination of a data broadcast signal and a TV broadcast signal or the combination of a data broadcast signal and a radio broadcast signal. The broadcast-related information may be provided to the mobile terminal 100 through a mobile communication network. In this case, the broadcast-related information may be received by the mobile communication module 113, rather than by the broadcast reception module 111. The broadcast-related information may come in various forms. For example, the broadcast-related information may come in the form of digital multimedia broadcasting (DMB) electronic program guide (EPG) or digital video broadcasting-handheld (DVB-H) electronic service guide (ESG).

The broadcast reception module 111 may receive broadcast signals using various broadcasting systems, such as DMB-terrestrial (DMB-T), DMB-satellite (DMB-S), media forward link only (MediaFLO), DVB-H, and integrated services digital broadcast-terrestrial (ISDB-T). In addition, the broadcast reception module 111 may be suitable not only for the above-mentioned digital broadcasting systems but also for nearly all types of broadcasting systems other than those set forth herein. The broadcast signal and/or the broadcast-related information received by the broadcast reception module 111 may be stored in the memory 160.

The mobile communication module 113 may transmit wireless signals to or receives wireless signals from at least one of a base station, an external terminal, and a server through a mobile communication network. The wireless signals may include various types of data according to whether the mobile terminal 100 transmits/receives voice call signals, video call signals, or text/multimedia messages.

The wireless Internet module 115 may be a module for wirelessly accessing the Internet. The wireless Internet module 115 may be embedded in the mobile terminal 100 or may be installed in an external device. The wireless Internet module 115 may use various wireless Internet technologies such as wireless local area network (WLAN), Wireless Broadband (WiBro), World Interoperability for Microwave Access (Wimax), and High Speed Downlink Packet Access (HSDPA).

The short-range communication module 117 may be a module for short-range communication. The short-range communication module 117 may use various short-range communication techniques such as Bluetooth®, radio frequency identification (RFID), infrared data association (IrDA), ultra wideband (UWB), and ZigBee®.

The GPS module 119 may receive position information from a plurality of GPS satellites.

The A/V input unit 120 may be used to receive audio signals or video signals. The A/V input unit 120 may include a camera 121 and a microphone 123. The camera 121 may process various image frames such as still images or moving images captured by an image sensor during a video call mode or an image capturing mode. The image frames processed by the camera 121 may be displayed by a display module 151.

The image frames processed by the camera 121 may be stored in the memory 160 or may be transmitted to an external device through the wireless communication unit 110. The mobile terminal 100 may include two or more cameras 121.

The microphone 123 may receive external audio signals during a call mode, a recording mode, or a voice recognition mode and may convert the received sound signals into electrical audio data. During the call mode, the mobile communication module 113 may convert the electrical sound data into data that can be readily transmitted to a mobile communication base station, and may then output the data obtained by the conversion. The microphone 123 may use various noise removal algorithms to remove noise that may be generated during the reception of external sound signals.

The user input unit 130 may generate key input data based on user input for controlling the operation of the mobile terminal 100. The user input unit 130 may be implemented as a keypad, a dome switch, or a static pressure or capacitive touch pad which is capable of receiving a command or information by being pushed or touched by a user. Alternatively, the user input unit 130 may be implemented as a wheel, a jog dial or wheel, or a joystick capable of receiving a command or information by being rotated. Still alternatively, the user input unit 130 may be implemented as a finger mouse. In particular, if the user input unit 130 is implemented as a touch pad and forms a mutual layer structure with the display module 151, the user input unit 130 and the display module 151 may be collectively referred to as a touch screen.

The sensing unit 140 may determine a current state of the mobile terminal 100 such as whether the mobile terminal 100 is opened or closed, the position of the mobile terminal 100 and whether the mobile terminal 100 is placed in contact with the user, and may generate a sensing signal for controlling the operation of the mobile terminal 100. For example, when the mobile terminal 100 is a slider-type mobile phone, the sensing unit 140 may determine whether the mobile terminal 100 is opened or closed. In addition, the sensing unit 140 may determine whether the mobile terminal 100 is powered by the power supply unit 190 and whether the interface unit 170 is connected to an external device.

The sensing unit 140 may include a proximity sensor 141, a pressure sensor 143 and a motion sensor 145. The proximity sensor 141 may detect an approaching object or whether there is an object nearby the mobile terminal 100 without mechanical contact. More specifically, the proximity sensor 141 may detect an approaching object based on a change in an alternating current (AC) magnetic field or a static magnetic field, or the rate of change of capacitance. The sensing unit 140 may include two or more proximity sensors 141.

The pressure sensor 143 may determine whether pressure is being applied to the mobile terminal 100 or may measure the magnitude of pressure, if any, applied to the mobile terminal 100. The pressure sensor 143 may be installed in a certain part of the mobile terminal 100 where the detection of pressure is necessary. For example, the pressure sensor 143 may be installed in the display module 151. In this case, it is possible to differentiate a typical touch input from a pressure touch input, which is generated by applying greater pressure than that used to generate a typical touch input, based on a signal output by the pressure sensor 143. In addition, it is possible to determine the magnitude of pressure applied to the display module 151 upon receiving a pressure touch input based on the signal output by the pressure sensor 143.

The motion sensor 145 may determine the location and motion of the mobile terminal 100 using an acceleration sensor or a gyro sensor.

Acceleration sensors are a type of device for converting a vibration in acceleration into an electric signal. With recent developments in micro-electromechanical system (MEMS) technology, acceleration sensors have been widely used in various products for various purposes ranging from detecting large motions such as car collisions as performed in airbag systems for automobiles to detecting minute motions such as the motion of the hand as performed in gaming input devices. In general, two or more acceleration sensors representing different axial directions are incorporated into a single package. There are some cases when the detection of only one axial direction, for example, a Z-axis direction, is necessary. Thus, when an X- or Y-axis acceleration sensor, instead of a Z-axis acceleration sensor, is required, the X- or Y-axis acceleration sensor may be mounted on an additional substrate, and the additional substrate may be mounted on a main substrate.

Gyro sensors are sensors for measuring angular velocity, and may determine the relative direction of the rotation of the mobile terminal 100 to a reference direction.

The output unit 150 may output audio signals, video signals and alarm signals. The output unit 150 may include the display module 151, an audio output module 153, an alarm module 155, and a haptic module 157.

The display module 151 may display various information processed by the mobile terminal 100. For example, if the mobile terminal 100 is in a call mode, the display module 151 may display a user interface (UI) or a graphic user interface (GUI) for making or receiving a call. If the mobile terminal 100 is in a video call mode or an image capturing mode, the display module 151 may display a UI or a GUI for capturing or receiving images.

If the display module 151 and the user input unit 130 form a mutual layer structure and are thus implemented as a touch screen, the display module 151 may be used not only as an output device but also as an input device capable of receiving information by being touched by the user.

If the display module 151 is implemented as a touch screen, the display module 151 may also include a touch screen panel and a touch screen panel controller. The touch screen panel is a transparent panel attached onto the exterior of the mobile terminal 100 and may be connected to an internal bus of the mobile terminal 100. The touch screen panel keeps monitoring whether the touch screen panel is being touched by the user. Once a touch input to the touch screen panel is received, the touch screen panel transmits a number of signals corresponding to the touch input to the touch screen panel controller. The touch screen panel controller processes the signals transmitted by the touch screen panel, and transmits the processed signals to the controller 180. Then, the controller 180 determines whether a touch input has been generated and which part of the touch screen panel has been touched based on the processed signals transmitted by the touch screen panel controller.

The display module 151 may include electronic paper (e-paper). E-paper is a type of reflective display technology and can provide as high resolution as ordinary ink on paper, wide viewing angles, and excellent visual properties. E-paper can be implemented on various types of substrates such as a plastic, metallic or paper substrate and can display and maintain an image thereon even after power is cut off. In addition, e-paper can reduce the power consumption of the mobile terminal 100 because it does not require a backlight assembly. The display module 151 may be implemented as e-paper by using electrostatic-charged hemispherical twist balls, using electrophoretic deposition, or using microcapsules.

The display module 151 may include at least one of an liquid crystal display (LCD), a thin film transistor (TFT)-LCD, an organic light-emitting diode (OLED), a flexible display, and a three-dimensional (3D) display. The mobile terminal 100 may include two or more display modules 151. For example, the mobile terminal 100 may include an external display module (not shown) and an internal display module (not shown).

The audio output module 153 may output audio data received by the wireless communication unit 110 during a call reception mode, a call mode, a recording mode, a voice recognition mode, or a broadcast reception mode or may output audio data present in the memory 160. In addition, the audio output module 153 may output various sound signals associated with the functions of the mobile terminal 100 such as receiving a call or a message. The audio output module 153 may include a speaker and a buzzer.

The alarm module 155 may output an alarm signal indicating the occurrence of an event in the mobile terminal 100. Examples of the event include receiving a call signal, receiving a message, and receiving a key signal. Examples of the alarm signal output by the alarm module 155 include an audio signal, a video signal and a vibration signal. More specifically, the alarm module 155 may output an alarm signal upon receiving an incoming call or message. In addition, the alarm module 155 may receive a key signal and may output an alarm signal as feedback to the key signal. Therefore, the user may be able to easily recognize the occurrence of an event based on an alarm signal output by the alarm module 155. An alarm signal for notifying the user of the occurrence of an event may be output not only by the alarm module 155 but also by the display module 151 or the audio output module 153.

The haptic module 157 may provide various haptic effects (such as vibration) that can be perceived by the user. If the haptic module 157 generates vibration as a haptic effect, the intensity and the pattern of vibration generated by the haptic module 157 may be altered in various manners. The haptic module 157 may synthesize different vibration effects and may output the result of the synthesization. Alternatively, the haptic module 157 may sequentially output different vibration effects.

The haptic module 157 may provide various other haptic effects than vibration such as a haptic effect obtained using a pin array that moves perpendicularly to a contact skin surface, a haptic effect obtained by injecting or sucking in air through an injection hole or a suction hole, a haptic effect obtained by giving a stimulus to the surface of the skin, a haptic effect obtained through contact with an electrode, a haptic effect obtained using an electrostatic force, and a haptic effect obtained by realizing the sense of heat or cold using a device capable of absorbing heat or generating heat. The haptic module 157 may be configured to enable the user to recognize a haptic effect using the kinesthetic sense of the fingers or the arms. The mobile terminal 100 may include two or more haptic modules 157.

The memory 160 may store various programs necessary for the operation of the controller 180. In addition, the memory 160 may temporarily store various data such as a list of contacts, messages, still images, or moving images.

The memory 160 may include at least one of a flash memory type storage medium, a hard disk type storage medium, a multimedia card micro type storage medium, a card type memory (e.g., a secure digital (SD) or extreme digital (XD) memory), a random access memory (RAM), and a read-only memory (ROM). The mobile terminal 100 may operate a web storage, which performs the functions of the memory 160 on the Internet.

The interface unit 170 may interface with an external device that can be connected to the mobile terminal 100. The interface unit 170 may be a wired/wireless headset, an external battery charger, a wired/wireless data port, a card socket for, for example, a memory card, a subscriber identification module (SIM) card or a user identity module (UIM) card, an audio input/output (I/O) terminal, a video I/O terminal, or an earphone. The interface unit 170 may receive data from an external device or may be powered by an external device. The interface unit 170 may transmit data provided by an external device to other components in the mobile terminal 100 or may transmit data provided by other components in the mobile terminal 100 to an external device.

When the mobile terminal 100 is connected to an external cradle, the interface unit 170 may provide a path for supplying power from the external cradle to the mobile terminal 100 or for transmitting various signals from the external cradle to the mobile terminal 100.

The controller 180 may control the general operation of the mobile terminal 100. For example, the controller 180 may perform various control operations regarding making/receiving a voice call, transmitting/receiving data, or making/receiving a video call. The controller 180 may include a multimedia player module 181, which plays multimedia data. The multimedia player module 181 may be implemented as a hardware device and may be installed in the controller 180. Alternatively, the multimedia player module 181 may be implemented as a software program.

The power supply unit 190 may be supplied with power by an external power source or an internal power source and may supply power to the other components in the mobile terminal 100.

The mobile terminal 100 may include a wired/wireless communication system or a satellite communication system and may thus be able to operate in a communication system capable of transmitting data in units of frames or packets.

Figure 2:
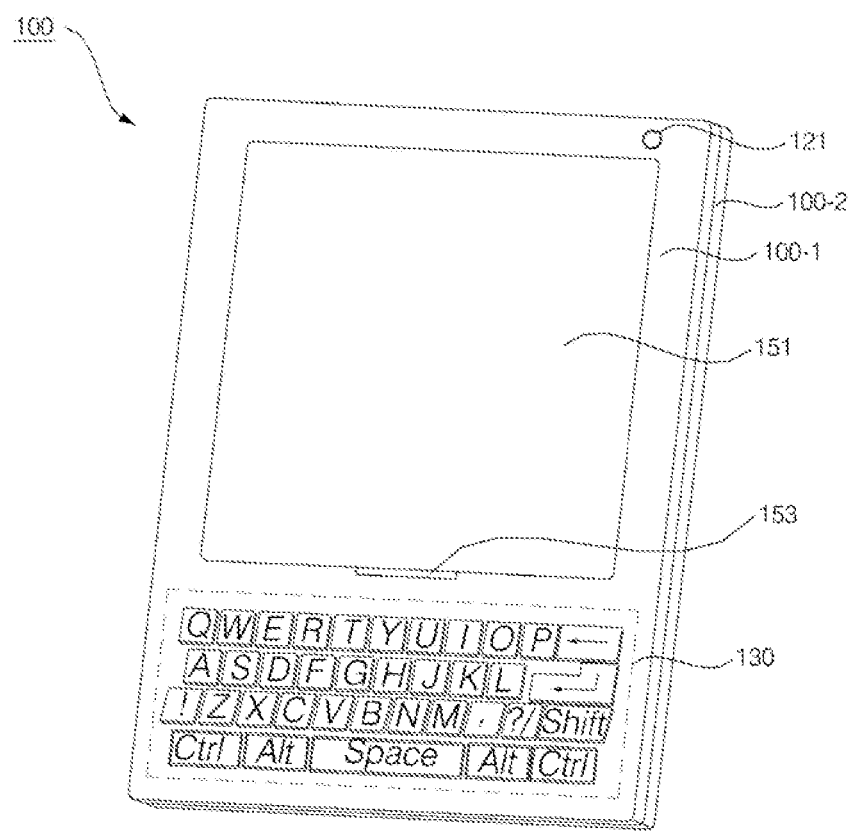
FIG. 2 illustrates a front perspective view of a mobile terminal according to an embodiment of the present invention.

The exterior of the mobile terminal 100 (e.g., an e-book reader) will hereinafter be described in detail with reference to FIG. 2. Referring to FIG. 2, the exterior of the mobile terminal 100 may be formed by a front case 100-1 and a rear case 100-2. Various electronic devices may be installed in the space formed by the front case 100-1 and the rear case 100-2. The front case 100-1 and the rear case 100-2 may be formed of a synthetic resin through injection molding. Alternatively, the front case 100-1 and the rear case 100-2 may be formed of a metal such as stainless steel (STS) or titanium (Ti).

The display module 151, the audio output module 153, the camera 121, and the user input unit 130 may be disposed in the main body of the mobile terminal 100, and particularly, in the front case 100-1.

If a touch pad is configured to overlap the display module 151 and thus to form a mutual layer structure, the display module 151 may serve as a touch screen. Thus, the user can enter various information simply by touching the display module 151.

The audio output module 153 may be implemented as a receiver or a speaker. The camera 121 may be configured to be suitable for capturing a still or moving image of the user.

Another user input unit (not shown), the microphone 123 and the interface unit 170 may be disposed on one side of the front case 100-1 or the rear case 100-2.

The user input unit 130 may adopt various tactile manners as long as it can offer tactile feedback to the user.

For example, the user input unit 130 may be implemented as a dome switch or touch pad capable of receiving a command or information by being pushed or touched by the user; or a wheel, a jog dial or wheel, or a joystick capable of receiving a command or information by being rotated. More specifically, the user input unit 130 may be used to enter various commands such as 'start', 'end', and 'scroll,' characters, numerals and special symbols to the mobile terminal 100 or to select an operating mode for the mobile terminal 100. In addition, the user input unit 130 may serve as a hot key for activating certain functions of the mobile terminal 100.

The microphone 123 may be configured to properly receive the user's voice or other sounds.

Another camera (not shown) may be provided at the back of the rear case 100-2. The camera at the back of the rear case 100-2 may have a different photographing direction and resolution from the camera 121. For example, the camera 121 may have a low resolution and may thus be suitable for capturing an image of the user to be transmitted during a video call. On the other hand, the camera at the back of the rear case 100-2 may have a high resolution and may thus be suitable for capturing an image of an ordinary subject.

Another audio output module (not shown) may be additionally provided in the rear case 100-2. The audio output module in the rear case 100-2 may realize a stereo function together with the audio output module 153, and may be used during a speaker-phone mode.

Not only an antenna (not shown) for making or receiving a call but also an antenna (not shown) for receiving a broadcast signal may be disposed on one side of the front case 100-1 or the rear case 100-2. The antennas may be installed so as to be able to be retracted from the rear case 100-2.

The power supply unit 190, which supplies power to the mobile terminal 100, may be disposed in the rear case 100-2. The power supply unit 190 may be a rechargeable battery and may be coupled to the rear case 100-2 so as to be attachable to or detachable from the rear case 100-2.

Figure 3:
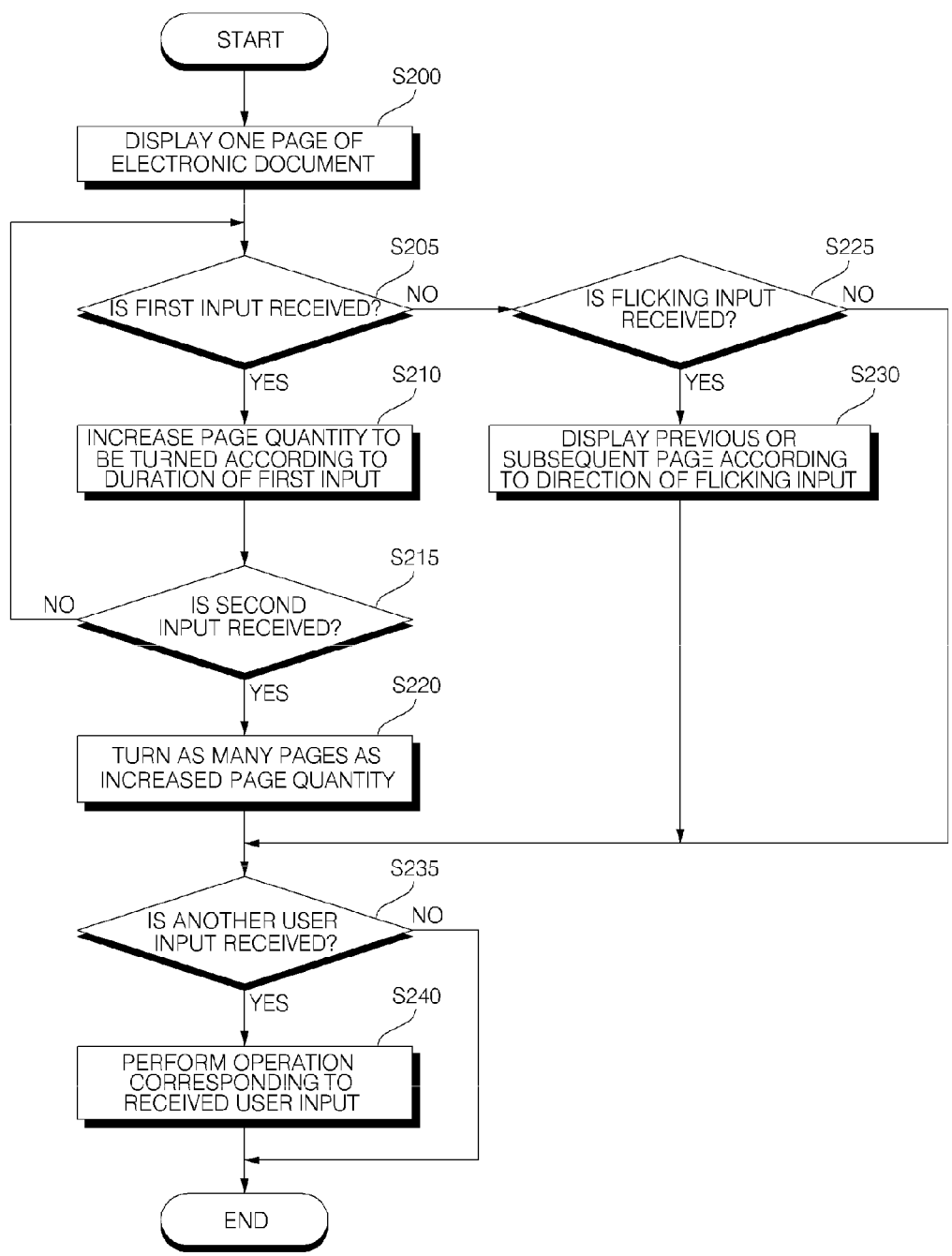
FIG. 3 is a flowchart illustrating controlling the operation of a mobile terminal according to an embodiment of the present invention.

Referring to FIG. 3, the controller 180 may display a page (hereinafter referred to as "the current page") of an electronic document on the display module 151 in response to a user command (S200). The term 'electronic document,' as used herein, indicates a type of document that can be written electronically, transmitted or stored by a device capable of processing information such as a computer.

When the current page is displayed on the display module 151, an indicator indicating a relative position of the current page in the electronic document may be displayed at a certain portion on the display module 151. While the current page is displayed, if a first input, such as a touch input, that satisfies a predefined condition is received (S205), the controller 180 may gradually increase a number of pages to be turned until the first input is completed or not detected any longer (S210). Examples of the predefined condition include, but are not restricted to, conditions regarding touch pressure, touch duration, touch frequency and the size of a touched area on the display module 151.

The number of pages may be initially set to a default value of 1, but the present invention is not restricted to this. That is, the default value to which the page quantity is initially set may be arbitrarily determined in accordance with a user command. The speed at which the pages of the electronic document are turned may increase according to the duration of the first input. The controller 180 may apply to the electronic document a screen effect such as the effect of flipping a number of pages of the electronic document corresponding to the page quantity as if the electronic document were a physical book.

If a second input is detected from the current page (S215), the controller 180 may turn a number of pages of the electronic document corresponding to the page quantity determined in operation S210 (S220). For example, if the page quantity determined in operation S210 is 5, the controller 180 may turn five pages, and may display the sixth page from the current page on the display module 151.

The second input may be a drag or flicking input that directly follows the first input, but the present invention is not restricted to this. That is, various types of user inputs other than a drag or flicking input can be used as the second input. In operation S220, the controller 180 may apply a screen effect, such as animation of flipping pages, to the electronic document to provide an illusionary feel of a physical book.

If a flicking input is detected from the current page without receiving the first input (S225), the controller 180 may display the previous or subsequent page relative to the current page according to the direction of the detected flick (S230). The term 'flicking input,' as used herein, indicates scratching lightly on the surface of a touch screen with a finger. A touch input and a flicking input may be differentiated from each other based on how long the display module 151 is touched with, for example, a finger.

If another user input, such as a key input or a typical touch input, is detected (S235), the controller 180 may control an operation corresponding to the detected user input to be performed (S240). In this manner, it is possible to quickly navigate from the current page to any desired page of the electronic document with ease.

In this exemplary embodiment, if a touch input that satisfies the predefined condition is detected from an electronic document screen, a page quantity to be turned may be determined based on the duration of the touch input. Alternatively, if a touch input that satisfies the predefined condition is detected from a page currently being displayed on the electronic document screen, the chapter numbers and titles of subsequent chapters relative to the chapter including the current page may be sequentially displayed one after another until the touch input is completed or not detected any longer. Thereafter, if a drag or flicking input, which begins from where the touch input is detected on the current page, is received, a page of a chapter corresponding to a chapter title displayed at the time when the drag or flicking input is detected may be displayed.

Still alternatively, if a page currently being displayed on an electronic document screen is touched and then dragged to a first direction, a page quantity to be turned may be determined based on the distance by which the current page is dragged. Thereafter, if the current page is dragged to a second direction, the controller 180 may flip a number of pages corresponding to the determined page quantity.

Figure 4:
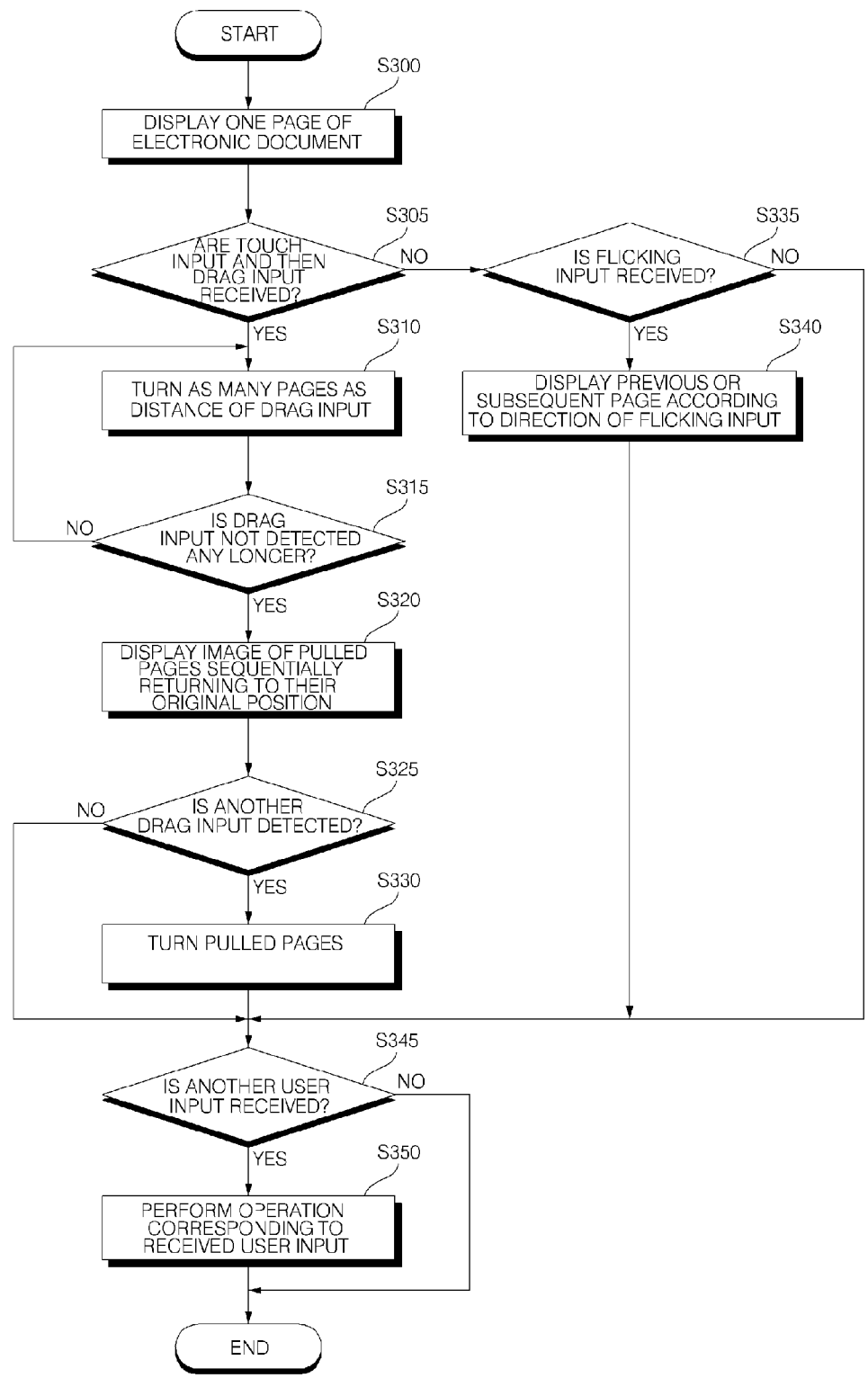
FIG. 4 is a flowchart illustrating controlling the operation of a mobile terminal according to another embodiment of the present invention.
Figure 5:
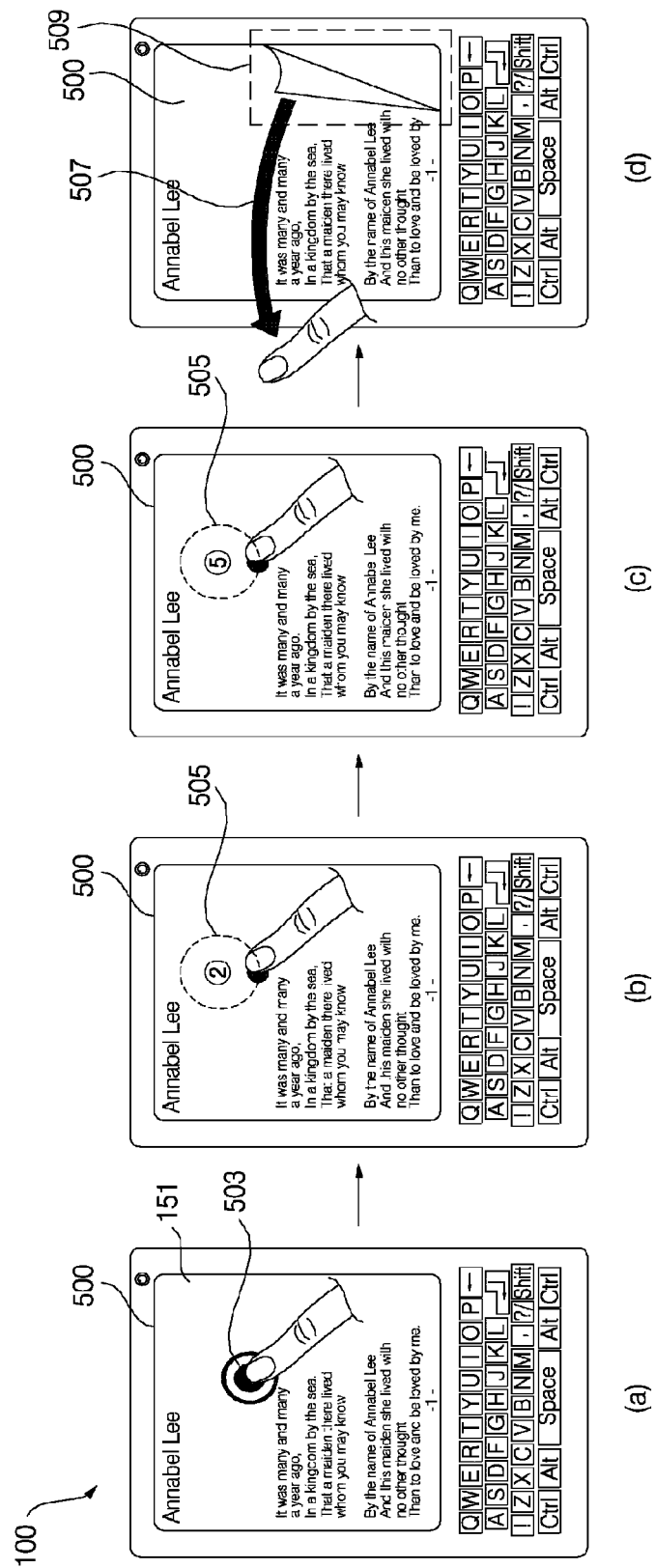
FIGS. 5 through 7 are diagrams illustrating turning a number of pages of an electronic document in accordance with a page quantity determined in response to a predefined user input according to various embodiments of the present invention.
Figure 6:
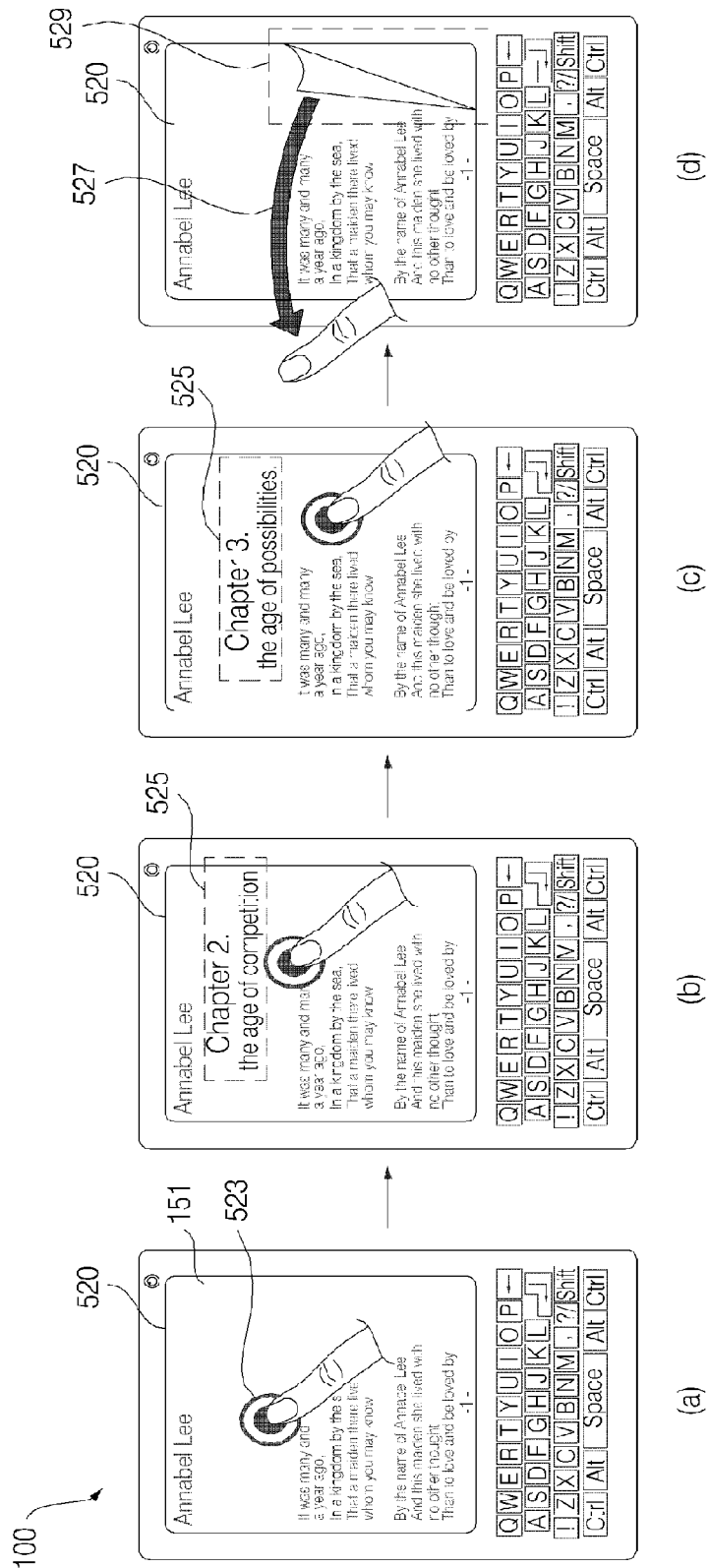
Figure 7:
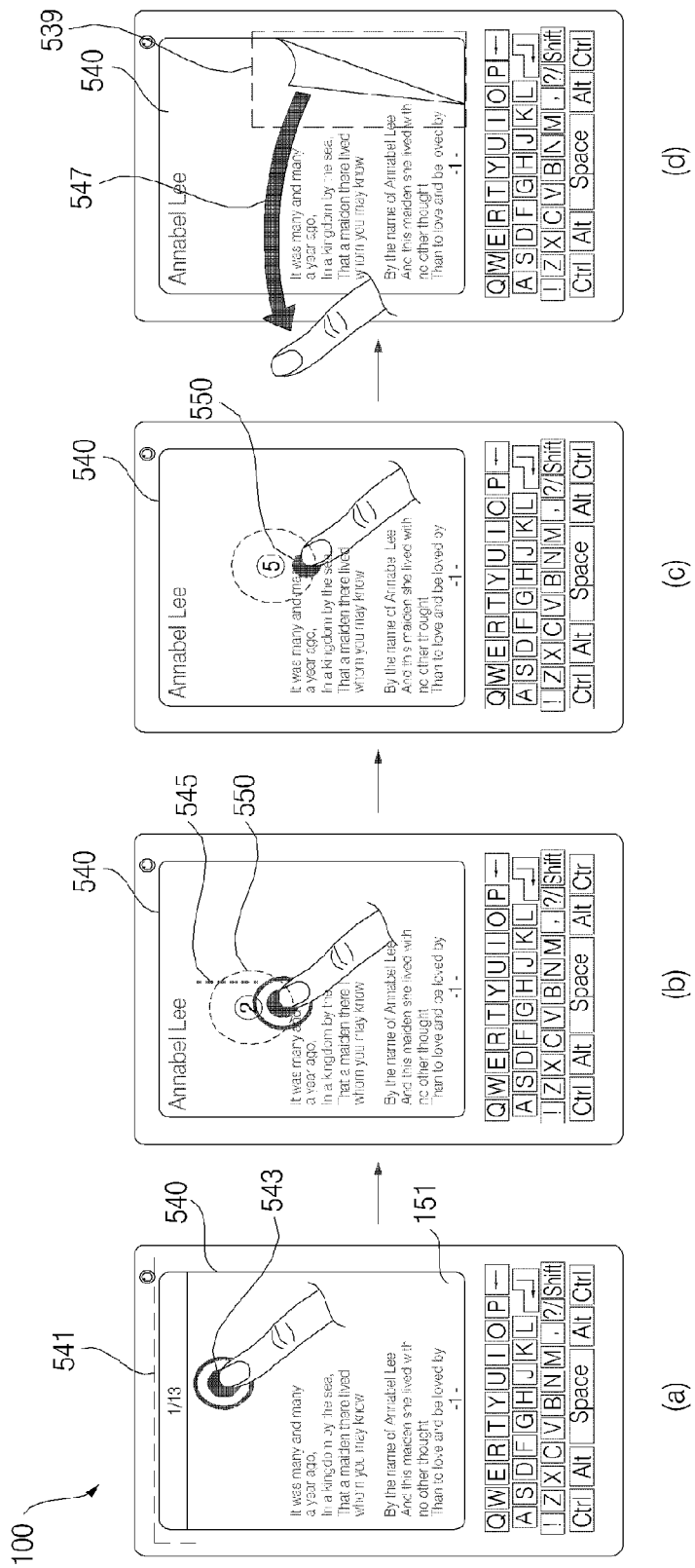

In FIG. 4, operations 5300, 5335, 5340, 5345 and 5350 are the same as their respective counterparts in FIG. 3, and thus, detailed descriptions thereof will be omitted. Referring to FIG. 4, if a touch input and a subsequent drag input are detected from the display module 151 when one page (hereinafter referred to as "the current page") of the electronic document is displayed on the display module 151 (S305), the controller 180 may display an image of a number of pages of the electronic document (including the current page) based on the distance of the drag input being pulled to the direction of the drag input so that the subsequent page can be partially revealed (S310).

The pulling of pages of the electronic document performed in operation 5310 may continue until the drag input detected in operation 5305 is not detected any longer (S315). If the drag input detected in operation 5305 is not detected any longer, the controller 180 may display an image of the pulled pages returning to their original position sequentially in reverse order to which they are pulled, and may display the current page back on the display module 151 (S320).

The subsequent page to the pulled pages may be marked with a page number. The pulled pages may be displayed transparently so that the subsequent page can be seen therethrough.

Thereafter, if a drag input is detected from the display module 151 in the same direction as that of the touch-and-drag input detected in operation 5305 (S325), the controller 180 may flip the pulled pages, and may display the subsequent page to the pulled pages on the display module 151 (S330).

On the other hand, if a drag input is detected from the display module 151 in the opposite direction to the direction of the touch-and-drag input detected in operation 5305, the entire page-turning operation may be terminated, and the current page may be displayed back on the display module 151.

In this manner, it is possible for the user to effectively navigate to any desired page in an electronic document using an intuitive method that can provide the sensation of flipping pages of a physical book. In some implementations, if a touch input that satisfies a predefined condition is detected, a page quantity to be turned may be determined based on the duration of the touch input. Thereafter, if a drag input is detected after the touch input, an image of a number of pages corresponding to the determined page quantity being pulled may be displayed regardless of the distance of the drag input, and the rest of the page-turning operation may be performed in the same manner as in the embodiment described referring to FIG. 4.

The embodiments of the present invention described referring to FIGS. 3 and 4 will be described in further detail with reference to FIGS. 5(a) through 12(c). FIGS. 5(a) through 7(d) illustrate turning a number of pages corresponding to a page quantity determined in response to a predefined user input.

Referring to FIGS. 5(a) and 5(b), if a touch input 503 that generates a pressure level that is equal to or greater than a predefined pressure level is received continuously for more than a predefined period of time when an electronic document screen 500 is displayed on the display module 151, a page quantity 505 to be turned may be displayed on the electronic document screen 500. As shown in FIG. 5(c), the page quantity 505 may gradually increase as the duration of the touch input 503 increases. More specifically, the longer the duration of the touch input 503 or the greater the pressure of the touch input 503, the faster the page quantity 505 increases.

Referring to FIG. 5(d), if a flicking or drag input 507 that begins from where the touch input 503 is detected is received after the page quantity 505 reaches a value desired by the user, a number of pages corresponding to the desired value may be turned. During the turning of pages of the electronic document, a screen effect 509, which can create the illusion of flipping pages of a physical book, may be provided. Pages of the electronic document may be flipped backward or forward according to the direction of the flicking input. In this manner, it is possible to flip multiple pages of the electronic document at once by touching on the electronic document in a predefined manner and then flicking or dragging on the electronic document.

FIGS. 6(a)-6(d) illustrate navigating through chapters in an electronic document. Referring to FIGS. 6(a)-6(c), if a touch input 523 that generates a pressure level that is equal to or greater than a predetermined pressure level is received continuously for more than a predefined period of time when an electronic document screen 520 is displayed on the display module 151, the numbers and/or titles of subsequent chapters relative to a chapter including the current page may appear one after another on the electronic document screen 520, as indicated by reference numeral 525 until the touch input 523 is not detected any longer. Referring to FIG. 6(d), if a flicking or drag input 527 that begins from where the touch input 523 is detected is received when a chapter desired by the user is reached, a page of the desired chapter may be displayed. In this case, a screen effect 529 that creates a multiple pages-flip animation may be applied to the electronic document screen 520.

If a drag input having almost the same pressure level as the touch input 523 is detected along a left-to-right or right-to-left direction when the chapter number and/or title of a predetermined chapter are displayed on the electronic document screen 520 and/or if the distance of the drag input is less than a predefined value, a previous or subsequent chapter relative to the predetermined chapter may be displayed on the display module 151.

FIGS. 7(a)-7(d) illustrate turning pages of an electronic document in response to a touch-and-drag input. Referring to FIG. 7(a), if a touch input 543 that satisfies a predefined condition is detected when an electronic document screen 540 is displayed on the display module 151, an indicator 541 indicating a page number of a current page and the total number of pages of the electronic document may be displayed on the electronic document screen 540.

Referring to FIG. 7(b), if a downward drag input 545 is detected after the touch input 543, a page quantity 550 may be displayed at a portion on the electronic document screen 540.

Referring to FIG. 7(c), the longer the distance of the downward drag input 545, the greater the page quantity 550 will become.

Referring to FIG. 7(d), if a leftward flicking or drag input 547 is detected when the page quantity 550 reaches a value desired by the user, a number of pages corresponding to the desired value may be turned. In this case, a screen effect 539, which can provide the sensation of flipping pages of a physical book, may be applied to the electronic document screen 540.

Figure 8:
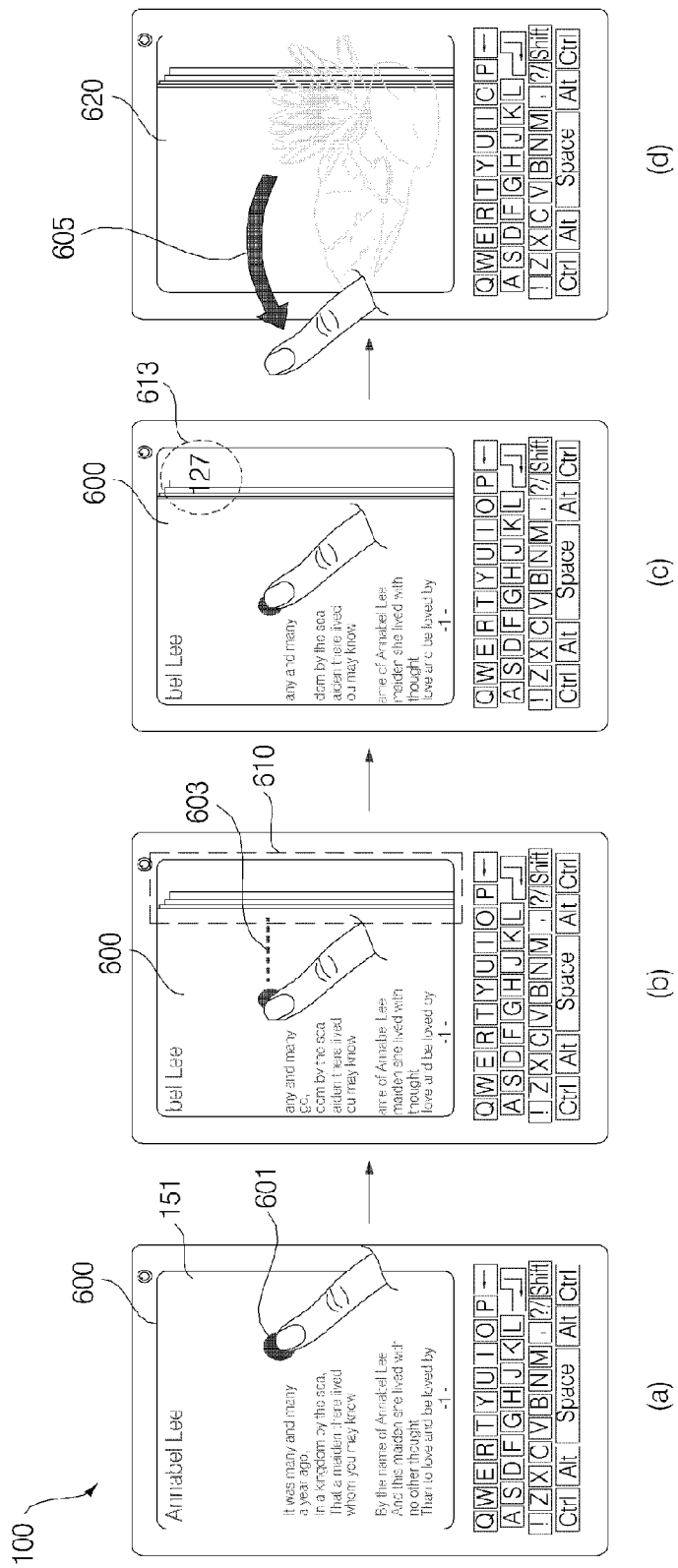
FIGS. 8 and 9 are diagrams illustrating turning pages of an electronic document by simulating a gesture, such as pulling or folding, for turning pages of a physical document according to various embodiments of the present invention.
Figure 9:
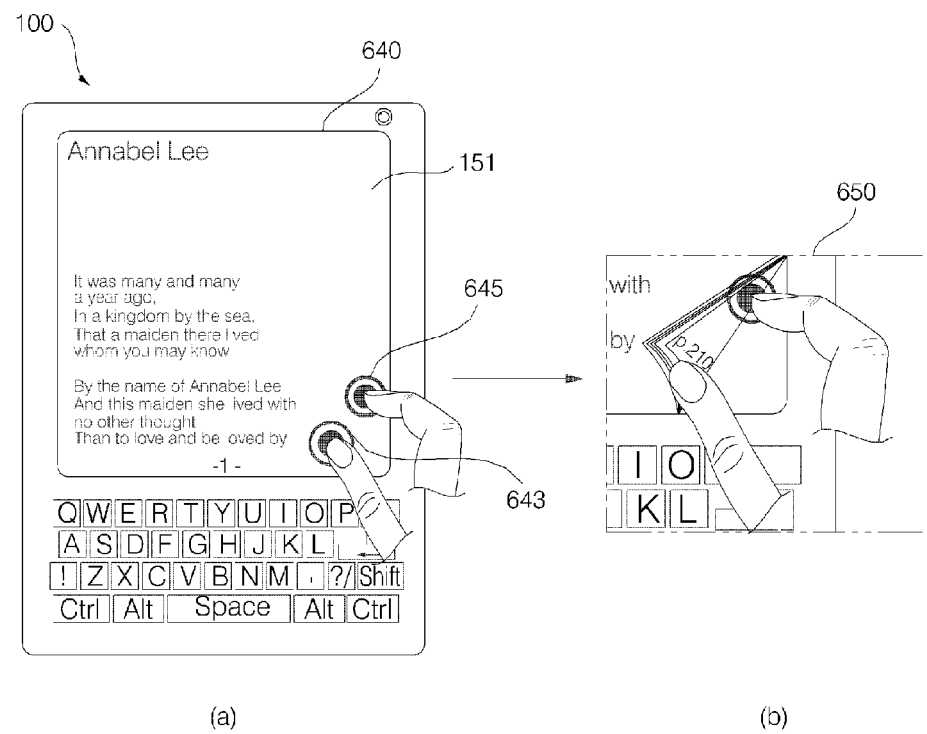

FIGS. 8(a)-9(b) illustrate turning pages of an electronic document by simulating a gesture such as pulling or folding of pages of a physical document. Referring to FIGS. 8(a) and 8(b), if a touch input 601 and a subsequent leftward drag input 603 are detected when an electronic document 600 showing a page (hereinafter referred to as "the current page") is displayed on the display module 151, an image 610 of a number of pages corresponding to the distance of the drag input 603 being pulled to the direction of the drag input 603 may be displayed. The pulled pages may be displayed transparently so that the content of the subsequent page can be viewed therethrough.

Referring to FIG. 8(c), an actual number 613 of pages, for example, "127," that have been pulled may be displayed at a portion of the display module 151. Further, if the drag input 603 is terminated and a predefined period of time elapses without receiving any further user input, the pulled pages may return to their original position, and the current page may be displayed back on the electronic document screen 600.

Referring to FIG. 8(d), if another leftward drag input or a leftward flicking input 605 is detected when a page quantity 613 reaches a value desired by the user, the pulled pages corresponding to the desired value may be turned so that the subsequent page can be fully displayed. On the other hand, if a rightward drag input is detected, the page-turning operation may be canceled, thus the display module 151 displaying the electronic document screen 600 as shown in FIG. 8(a).

Referring to FIGS. 9(a) and 9(b), if multiple touch inputs 643 and 645, for example, generated by touching on a lower right part of an electronic document screen 640 with a thumb and an index finger are detected, a page currently being displayed on the electronic document screen 640 and its subsequent pages may be displayed as being folded 650.

Thereafter, if there are, for example, 210 pages (including the current page) to turn, the page quantity "210" may be displayed at a back side of the last one of the folded pages. In this case, the user can make a desired page appear on the electronic document screen 640 by generating a flicking input that simulates a gesture such as counting bills or flipping through pages of a book. In other words, while the thumb maintains contact with the electronic document screen 640 at a substantially same position, the index finger may be used to flip the pages. Thus, the user may be able to navigate to the desired page via the multiple touch inputs 643 and 645. In this manner, it is possible to view the content of an electronic document as if it were a physical book. In addition, it is possible to quickly navigate to any desired page of the electronic document.

Figure 10:
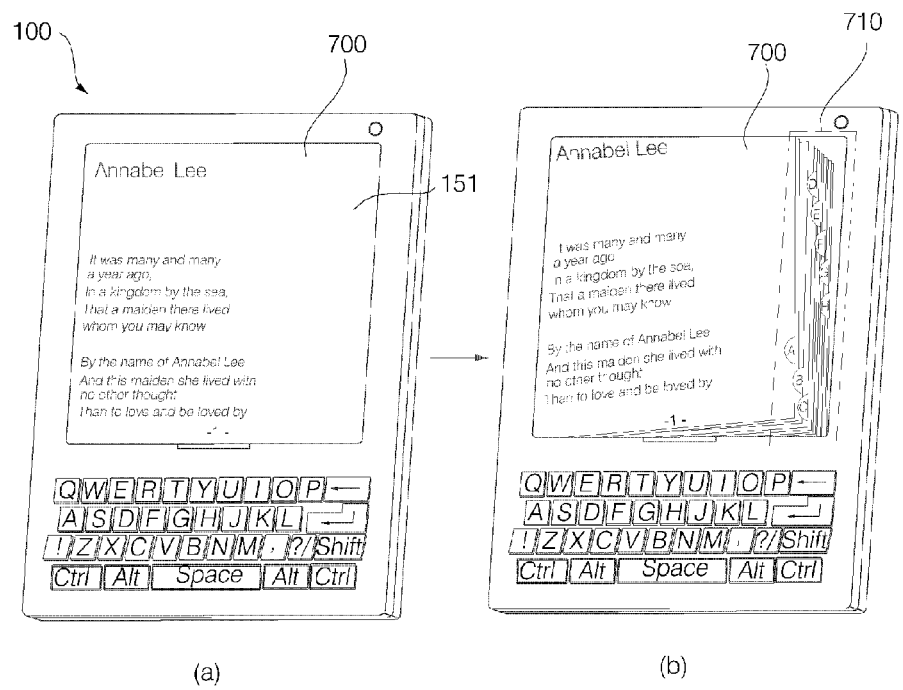
FIGS. 10 through 12 are diagrams illustrating turning pages of an electronic document using various input methods according to various embodiments of the present invention.
Figure 11:
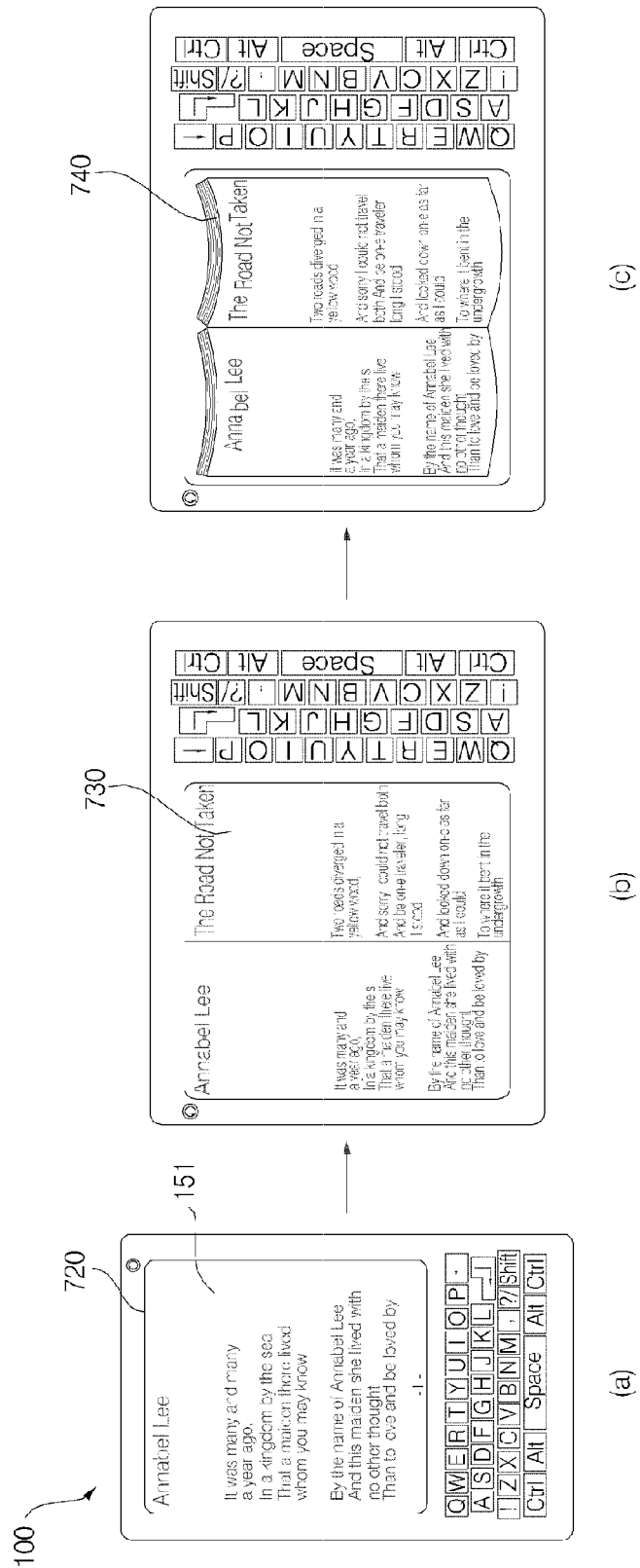
Figure 12:
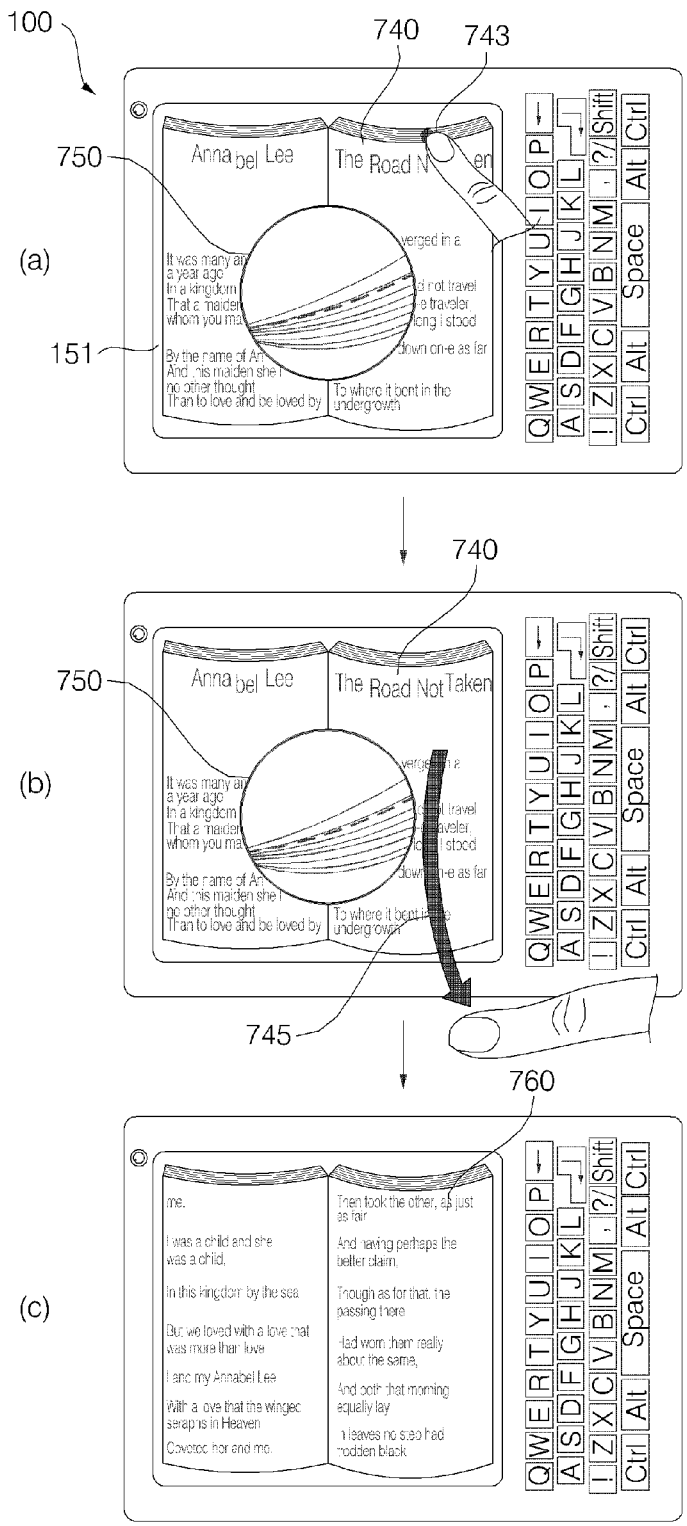

FIGS. 10(a) through 12(c) illustrate turning pages of an electronic document using various input methods. Referring to FIGS. 10(a) and 10(b), in response to an input, an electronic document may be presented on an electronic document screen 700 as an image of a book with a plurality of indexes or a table of contents, as indicated by reference numeral 710. In other words, in FIG. 10(a), only a single page of the electronic document is displayed, and the electronic document can be displayed in a different mode in response to the input, as shown in FIG. 10(b). In a mode shown in FIG. 10(b), the user may touch any one of the indexes "A"-"H" to navigate directly to a page corresponding to the touched index. Further, the user may determine the amount of content in the electronic document based on the indexes or the table of contents of the electronic document.

Referring to FIGS. 11(a) and 11(b), if the mobile terminal 100 is rotated by 90 degrees, for example, from the orientation shown in FIG. 11(a) to the orientation shown in FIG. 11(b), an electronic document screen may be converted from a one-page layout view (FIG. 11(a)) to a two-page layout view (FIG. 11(b)). Referring to FIG. 11(c), in response to another input, for example, if the mobile terminal 100 is swung back and forth, the electronic document may be presented as an image 740 of a book that shows its top edge, and thus, the user may determine the amount of content or an approximate number of pages in the electronic document based on the thickness of the book as displayed.

The image 740 may be displayed at the top or bottom of the electronic document screen according to the direction in which the mobile terminal 100 is tilted. The image 740 may be configured to disappear if the mobile terminal 100 is swung back and forth again or if a predefined motion of the mobile terminal 100 other than a swing of the mobile terminal 100 is detected.

Referring to FIG. 12(a), if a portion of the top edge of the e-book in the image 740 is touched with a finger, as indicated by reference numeral 743, an enlarged view 750 of the touched portion may be displayed at a portion, for example, in the middle, of the electronic book screen.

Referring to FIGS. 12(b) and 12(c), if a downward drag or flicking input 745 is detected when one point in the thickness of the book in the enlarged view 750 is selected, a page corresponding to the selected point in the thickness of the book in the enlarged view 750 may be displayed on the electronic book screen, as indicated by reference numeral 760.

As shown in FIGS. 11(a)-12(c), an electronic document can be viewed in a one-page layout or in a two-page layout. When the electronic document is presented as an image of a book, the user can estimate the number of pages to go through to finish the entire electronic document and can also determine the number of pages to be turned based on the thickness of the book.

The described mobile terminal and the method of controlling the operation of the mobile are not restricted to the exemplary embodiments set forth herein. Therefore, variations and combinations of the exemplary embodiments set forth herein may fall within the scope of the present invention.

Various features can be realized as code that can be read by a processor (such as a mobile station modem (MSM)) included in a mobile terminal and that can be written on a computer-readable recording medium. The computer-readable recording medium may be any type of recording device in which data is stored in a computer-readable manner. Examples of the computer-readable recording medium include a ROM, a RAM, a CD-ROM, a magnetic tape, a floppy disc, an optical data storage, and a carrier wave (e.g., data transmission through the Internet). The computer-readable recording medium can be distributed over a plurality of computer systems connected to a network so that computer-readable code is written thereto and executed therefrom in a decentralized manner. Functional programs, code, and code segments needed for realizing the present invention can be easily construed by one of ordinary skill in the art.

As described above, it is possible to allow a user to navigate freely or directly to any desired page in an electronic document with the sensation of reading a real book by using a new input method that involves using various combinations of a touch input, a drag input, and a flicking input. In addition, it is possible to effectively control various operations associated with the display of electronic documents on mobile terminals by using the new input method as well as existing input methods.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A method of controlling display of an electronic document in a mobile terminal, the method comprising:

displaying an electronic document screen showing one page among a plurality of pages of the electronic document on a display of the mobile terminal;

receiving a first input for setting a number of pages to be turned among the plurality of pages via the electronic document screen, the first input causing display of a first indicator or second indicator according to a user setting comprising a first setting and a second setting;

displaying the first indicator representing the number of pages to be turned at a portion of the electronic document screen according to the first setting, wherein the number of pages indicated by the first indicator increases at an accelerated speed when duration of the first touch input is equal to or greater than a threshold period of time and the user setting is set to the first setting;

displaying the second indicator representing a single chapter of the electronic document at a portion of the electronic document screen according to the second setting when the user setting is set to the second setting, the single chapter indicated by the second indicator sequentially changing in order until the first input is completed;

setting the number of pages according to the number of pages indicated by the first indicator or the chapter indicated by the second indicator based on the duration of the first input, the number of pages increasing as the duration increases;

flipping through the set number of pages in response to a second input, the second input comprising a flicking input, wherein the set number of pages are flipped backward or forward according to a direction of the flicking input;

rotating the electronic document screen on the display in response to rotation of the mobile terminal, the rotation initiated while the one page is displayed, such that a one-page layout view of the electronic document screen is changed to a two-page layout view when the electronic document screen is rotated;

displaying the electronic document as an open book-like image in response to a first predefined gesture input that is received while the electronic document screen is in the two-page layout view, the open book-like image providing a graphical representation of all pages of the electronic document, a thickness of the graphical representation varying based on a total number of the pages of the electronic document;

displaying a magnified view of a portion of the graphical representation corresponding to the thickness at a middle portion of the open book-like image in response to a first touch input that is received at the portion of the graphical representation corresponding to the thickness;

displaying a page corresponding to a point in the graphical representation corresponding to the thickness in response to a second touch input for selecting the point that is received while the magnified view is displayed; and making the open book-like image disappear from the electronic document screen in response to a second predefined gesture input that is received while the electronic document is displayed as the open book-like image.

2. The method of claim 1, further comprising:
receiving a third input; and
displaying an image of a book corresponding to the electronic document in response to the third input,
wherein the image of the book is displayed with a thickness representative of a total number of pages of the book.

3. The method of claim 2, wherein the book is displayed with indexes on at least some of the pages of the book.

4. The method of claim 2, wherein the third input comprises rotating the mobile terminal about an axis that meets a threshold degree of rotation.

5. The method of claim 1, wherein the flicking input is initiated from a first point of the electronic document screen on which the first input was received.

6. The method of claim 1, further comprising displaying a page of a chapter that was displayed last by the second indicator in response to the second input.

7. The method of claim 1, further comprising receiving an input for setting the user setting to the first setting or the second setting prior to receiving the first input.

8. The method of claim 1, wherein the first input is receivable at a portion of the electronic document screen on which content of the electronic document is displayed.

9. The method of claim 1, wherein:
the first input is followed by the second input to turn the set number of pages; and
the set number of pages are not turned if the first input is not followed by the second input.

10. The method of claim 9, wherein the first indicator is displayed prior to receiving the second input.

11. The method of claim 1, further comprising:
displaying a subsequent page following the set number of pages flipped through on the electronic document screen.

12. A method of controlling display of an electronic document in a mobile terminal, the method comprising:
displaying an electronic document screen showing one page among a plurality of pages of the electronic document on a display of the mobile terminal;
receiving a first input comprising a first drag input in a first direction on the electronic document screen, the first drag input starting from a first point and ending at a second point on the electronic document screen;
displaying the electronic document screen showing N number of pages in response to the first input, wherein N is determined based on a distance between the first point and the second point, and the N number of pages are visually pulled or lifted up in real time while the first input is received such that the N number of pages are displayed in a virtual stack, each of the N number of pages being displayed individually in the virtual stack;
receiving a second input comprising a second drag input or a first flicking input in the first direction on the electronic document screen, the second drag input or the first flicking input starting from the second point;
flipping through the N number of pages in response to the second input, wherein the pulled N number of pages sequentially return to their original position in the absence of the second input;
displaying a subsequent page following the N number of pages flipped through on the electronic document screen;
rotating the electronic document screen on the display in response to rotation of the mobile terminal, the rotation initiated while the one page is displayed, such that a one-page layout view of the electronic document screen is changed to a two-page layout view when the electronic document screen is rotated;
displaying the electronic document as an open book-like image in response to a first predefined gesture input that is received while the electronic document screen is in the two-page layout view, the open book-like image providing a graphical representation of all pages of the electronic document, a thickness of the graphical representation varying based on a total number of the pages of the electronic document;
displaying a magnified view of a portion of the graphical representation corresponding to the thickness at a middle portion of the open book-like image in response to a first touch input that is received at the portion of the graphical representation corresponding to the thickness;
displaying a page corresponding to a point in the graphical representation corresponding to the thickness in response to a second touch input for selecting the point that is received while the magnified view is displayed; and
making the open book-like image disappear from the electronic document screen in response to a second predefined gesture input that is received while the electronic document is displayed as the open book-like image.

13. The method of claim 12, further comprising:
receiving a second flicking input via the electronic document screen;
flipping through a single page from a currently displayed page in response to the second flicking input; and
displaying a previous or next page relative to the currently displayed page based on a direction of the second flicking input.

14. The method of claim 12, further comprising:
receiving a third flicking input, wherein the third flicking input comprises a plurality of flicking inputs and a first one of the plurality of flicking inputs is initiated subsequent to the multiple touch input from the fourth point while the first touch input remains at the third point during the third flicking input;
flipping pages sequentially in response to the third flicking input; and
displaying a page number of each of the flipped pages on a portion of each of the flipped pages, the page number changing sequentially as more pages are flipped through.

15. The method of claim 12, further comprising displaying an indicator including the N number at a portion of the electronic document screen.

16. The method of claim 12, further comprising;
displaying an indicator including a page number of a page that will be displayed after the N number of pages are turned; and
displaying the page number on the subsequent page displayed on the electronic document screen.

17. The method of claim 12, further comprising:
receiving a third input comprising a drag input in a second direction subsequent to the first input; and returning to displaying the electronic document screen showing the at least one full page in response to the third input, stopping displaying the electronic document screen showing the N number of pages.

18. The method of claim 12, further comprising:
receiving a multiple touch input, including a third touch input at a third point and a fourth touch input at a fourth point, on the electronic document screen, wherein the third and fourth touch inputs are received together on the electronic document screen; and
displaying a corner portion of a page currently being displayed on the electronic document screen and its subsequent pages as being folded in response to the multiple touch input.

19. A mobile terminal comprising:
a display module comprising a touchscreen and configured to:
   display an electronic document screen showing one page among a plurality of pages of an electronic document;
   receive a first input for setting a number of pages to be turned among the plurality of pages via the electronic document screen, the first input causing display of a first indicator or second indicator according to a user setting comprising a first setting and a second setting; and
   receive a second input for flipping through the set number of pages via the electronic document screen, the second input comprising a flicking input; and
a controller configured to:
   control the display module to display the first indicator representing the number of pages to be turned at a portion of the electronic document screen, the number of pages indicated by the first indicator increasing at an accelerated speed when duration of the first input is equal to or greater than a threshold period of time;
   control the display module to display the second indicator representing a single chapter of the electronic document at a portion of the electronic document screen according to the second setting when the user setting is set to the second setting, the single chapter indicated by the second indicator sequentially changing in order until the first input is completed;
   set the number of pages according to the number of pages indicated by the first indicator or the chapter indicated by the second indicator depending on the user setting based on the duration of the first input, the number of pages increasing as the duration increases;
   flip through the set number of pages in response to the second input;
   rotate the electronic document screen on the touchscreen in response to rotation of the mobile terminal, the rotation initiated while the one page is displayed, such that a one-page layout view of the electronic document screen is changed to a two-page layout view when the electronic document screen is rotated;
   control the display module to display the electronic document as an open book-like image in response to a first predefined gesture input that is received while the electronic document screen is in the two-page layout view, the open book-like image providing a graphical representation of all pages of the electronic document, a thickness of the graphical representation varying based on a total number of the pages of the electronic document;
   control the display module to display a magnified view of a portion of the graphical representation corresponding to the thickness at a middle portion of the open book-like image in response to a first touch input that is received at the portion of the graphical representation corresponding to the thickness;
   control the display module to display a page corresponding to a point in the graphical representation corresponding to the thickness in response to a second touch input for selecting the point that is received while the magnified view is displayed; and
   control the display module to make the open book-like image disappear from the electronic document screen in response to a second predefined gesture input that is received while the electronic document is displayed as the open book-like image.

20. The mobile terminal of claim 19, wherein the second input comprises a flicking or drag input that begins from a first point of the electronic document screen on which the first input was received.

21. The mobile terminal of claim 19, wherein the display module is further configured to receive a drag input, the drag input starting from a first point and ending at a second point on the electronic document screen, wherein the number of pages is determined based on a distance between the first point and the second point, and wherein the set number of pages are visually pulled or lifted up in real time while the drag input is received such that the set number of pages are displayed in a virtual stack, each of the set number of pages being displayed individually in the virtual stack.

22. The mobile terminal of claim 19, wherein the display module is further configured to:
   receive a multiple touch input, which comprises a first touch input at a first point and a second touch input at a second point on the electronic document screen; and
   receive a plurality of flicking inputs, wherein a first one of the plurality of flicking inputs is initiated subsequent to the multiple touch input from the second point while the first touch input remains at the first point during the plurality of flicking inputs, and
wherein the controller is further configured to control the display module to:
   flip pages sequentially in response to the plurality of flicking inputs; and
   display a page number of each of the flipped pages on a portion of each of the flipped pages, the page number changing sequentially as more pages are flipped through.

23. The mobile terminal of claim 19, wherein the controller is configured to control the display module to display a subsequent page following the set number of pages flipped through on the electronic document screen.

* * * * *